(12) United States Patent
Yu

(10) Patent No.: US 10,882,460 B2
(45) Date of Patent: Jan. 5, 2021

(54) EXTENSION TUBE-TYPE VEHICLE-MOUNTED BACK SUPPORT

(71) Applicant: BENZHI (SHENZHEN) INFORMATION TECHNOLOGY CO., LTD., Guangdong (CN)

(72) Inventor: Fan Yu, Shenzhen (CN)

(73) Assignee: BENZHI (SHENZHEN) INFORMATION TECHNOLOGY CO., LTD., Guangdong (CN)

( * ) Notice: Subject to any disclaimer, the term of this patent is extended or adjusted under 35 U.S.C. 154(b) by 1 day.

(21) Appl. No.: 16/348,501

(22) PCT Filed: Mar. 7, 2018

(86) PCT No.: PCT/CN2018/078210
§ 371 (c)(1),
(2) Date: May 9, 2019

(87) PCT Pub. No.: WO2018/177088
PCT Pub. Date: Oct. 4, 2018

(65) Prior Publication Data
US 2019/0263326 A1 Aug. 29, 2019

(30) Foreign Application Priority Data
Mar. 30, 2017 (CN) .................... 2017 2 0325512 U

(51) Int. Cl.
*B60R 11/02* (2006.01)
*F16M 13/02* (2006.01)
*B60R 11/00* (2006.01)

(52) U.S. Cl.
CPC ............. *B60R 11/02* (2013.01); *F16M 13/02* (2013.01); *B60R 2011/0017* (2013.01);
(Continued)

(58) Field of Classification Search
CPC .. B60R 11/02; B60R 2011/0017; F16M 13/02
(Continued)

(56) References Cited

U.S. PATENT DOCUMENTS 6,356,645 B1 * 3/2002 Trenkle ............... B60R 11/0217
181/141
7,364,230 B2 * 4/2008 Zheng ................. B60R 11/0235
297/188.2

(Continued)

FOREIGN PATENT DOCUMENTS

KR 100672009 B1 * 1/2007
WO WO-0043240 A1 * 7/2000 ......... B60R 11/0223

*Primary Examiner* — Nathan J Newhouse
*Assistant Examiner* — Lester L Vanterpool
(74) *Attorney, Agent, or Firm* — Leong C. Lei

(57) ABSTRACT

Disclosed is an extension tube-type vehicle-mounted back support comprising a mounting rod and a mounting part mounted on the mounting rod and used for fixing a mobile terminal. The mounting rod comprises a connector and two connection tubes respectively connected to the left and right ends of the connector, wherein outer ends of the two connection tubes are both connected to a clamping part, an extension spring is provided inside at least one of the connection tubes, and the corresponding clamping part is arranged in a manner of shifting to the left and right relative to the connection tube with the action of the extension spring. The overall structure of the mounting rod is simple and compact and has good stability. By designing the mounting rod as an elastically extending structure, the mounting rod can be directly installed on a vehicle seat headrest metal rod.

5 Claims, 4 Drawing Sheets

(52) U.S. Cl.
CPC .............. *B60R 2011/0059* (2013.01); *B60R 2011/0071* (2013.01); *B60R 2011/0087* (2013.01); *B60R 2011/0276* (2013.01)

(58) Field of Classification Search
USPC ........................................................ 224/275
See application file for complete search history.

(56) References Cited

U.S. PATENT DOCUMENTS

| | | | | |
|---|---|---|---|---|
| 7,891,619 B2* | 2/2011 | Perlman | ............... | F16B 7/1418 248/229.14 |
| 8,602,277 B2* | 12/2013 | Lee | ............... | B60R 11/0258 224/282 |
| 8,851,345 B2* | 10/2014 | Ackeret | ............... | B60R 7/043 224/275 |
| 8,864,226 B2* | 10/2014 | Fan | ............... | B60N 3/004 297/188.05 |
| 8,888,187 B2* | 11/2014 | Albino | ............... | B60N 2/885 297/397 |
| 9,273,824 B1* | 3/2016 | Tsai | ............... | F16M 13/022 |
| 9,457,732 B2* | 10/2016 | Qian | ............... | B60R 11/02 |
| 9,476,439 B1* | 10/2016 | Liao | ............... | B25B 5/06 |
| 9,701,256 B2* | 7/2017 | Haymond | ............... | B60R 11/02 |
| 2003/0150892 A1* | 8/2003 | Hoe | ............... | B60R 5/006 224/275 |
| 2011/0006091 A1* | 1/2011 | Schafer | ............... | F16M 11/32 224/282 |
| 2012/0091177 A1* | 4/2012 | Ackeret | ............... | B60R 7/043 224/275 |
| 2013/0068809 A1* | 3/2013 | Wang | ............... | B60R 11/02 224/275 |
| 2014/0209777 A1* | 7/2014 | Klemin | ............... | F16M 11/10 248/544 |
| 2014/0291465 A1* | 10/2014 | Mendoza | ............... | F16M 13/02 248/346.06 |
| 2017/0313260 A1* | 11/2017 | Minn | ............... | B60R 11/0235 |

* cited by examiner

EXTENSION TUBE-TYPE VEHICLE-MOUNTED BACK SUPPORT

BACKGROUND OF THE INVENTION

1. Field of the Invention

The present invention relates to a support for a mobile device such as a mobile phone, tablet and the like, and more particularly to an extension tube-type vehicle-mounted back support.

2. Description of the Prior Art

In these days, some of cars and other vehicles are mounted with fixed vehicle-mounted TVs, computers, etc. for passengers to watch to relieve the boring journey. There is no reliable placement platform in the car for passengers to place their own mobile phones, tablets, etc. People often hold mobile devices, such as mobile phones, tablets, etc., to watch, which will bring fatigue to the user. Therefore, a mobile phone bracket mounted on the back of the car seat is developed on the market. The mobile phone bracket is used for placing a mobile phone, tablet, etc. for the passenger sitting on the backseat. This way can reduce the fatigue of the viewer effectively. However, the conventional mobile phone bracket mounted on the back of the seat has some defects, such as: (1) the structural design is complicated; and (2) the operation is troublesome when the bracket is mounted on the back of the seat.

Therefore, it is necessary to develop a new technical solution to solve the above problems.

SUMMARY OF THE INVENTION

In view of the drawbacks of the prior art, the primary object of the present invention is to provide an extension tube-type vehicle-mounted back support. A mounting rod is designed as an elastically telescopic structure, and the installation application thereof is very simple. Besides, the overall structure of the mounting rod is simple, compact, and excellent in stability.

An extension tube-type vehicle-mounted back support comprises a mounting rod and a mounting part mounted on the mounting rod for retaining a mobile device. The mounting rod includes a connector and two connection tubes respectively connected to left and right ends of the connector. Outer ends of the two connection tubes are connected with clamping parts, respectively. At least one of the connection tubes is internally provided with a telescopic spring. A corresponding one of the clamping parts is biased by the telescopic spring to move left and right relative to the connection tube having the telescopic spring.

Preferably, the telescopic spring is an extension spring, and the clamping parts each have a U-shaped clamp with an opening facing outward.

Preferably, a U-shaped rubber buckle is attached to the U-shaped clamp.

Preferably, inner sides of the clamping parts are connected with insertion portions, and the insertion portions are inserted into the outer ends of the corresponding connection tubes.

Preferably, one of an outer surface of each insertion portion and an inner surface of each connection tube is provided with a rib, and the other of the outer surface of each insertion portion and the inner surface of each connection tube is provided with a groove. The rib is fitted into the groove. The rib and the groove extend in a same axial direction as the connection tubes.

Preferably, the mounting part includes a rotating rod mounted on the mounting rod, a ball joint assembly mounted on the rotating rod, and a brace mounted on the ball joint assembly. The rotating rod has a hollow rod body and a pivot interface connected to one side of the hollow rod body. The hollow rod body is fitted on the mounting rod. Upper and lower sides of the pivot interface are provided with locking walls each having a first connecting hole. The ball joint assembly has a pivot seat. The pivot seat has a second connecting hole. The pivot seat is inserted into the pivot interface. A screw is inserted through the first connecting hole of the upper locking wall, the second connecting hole and the first connecting hole of the lower locking wall in sequence. A lower end of the screw is fitted with an adjusting nut.

Preferably, the connector has a middle limiting portion and two connecting shaft portions extending outward from two sides of the middle limiting portion. One of the connection tubes is fitted on an outer periphery of one of the connecting shaft portions. The other connection tube is fitted on an outer periphery of the middle limiting portion. One end of the telescopic spring is fitted on an outer periphery of the other connecting shaft portion. Another end of the telescopic spring is connected to the corresponding clamping part. One end of the hollow rod body extends radially inwardly to form an annular stop portion. The hollow rod body is fitted on an outer periphery of the other connection tube. The annular stop portion is configured to limit an inner end of the other connection tube.

Preferably, the telescopic spring is a tension spring, and the corresponding clamping part has a hook portion with an opening facing inward.

The present invention has obvious advantages and beneficial effects compared with the prior art. Specifically, it can be known from the above technical solutions. The mounting rod is designed as an elastically telescopic structure, and the installation application thereof is very simple. The mounting rod is directly mounted to the metal rods of the seat headrest. When disassembled, the clamping part is moved inwardly so that the entire mounting rod can be taken out. Besides, the overall structure of the mounting rod is simple, compact, and excellent in stability.

Embodiments of the present invention will now be described, by way of example only, with reference to the accompanying drawings.

DETAILED DESCRIPTION OF THE PREFERRED EMBODIMENTS

Figure 1:
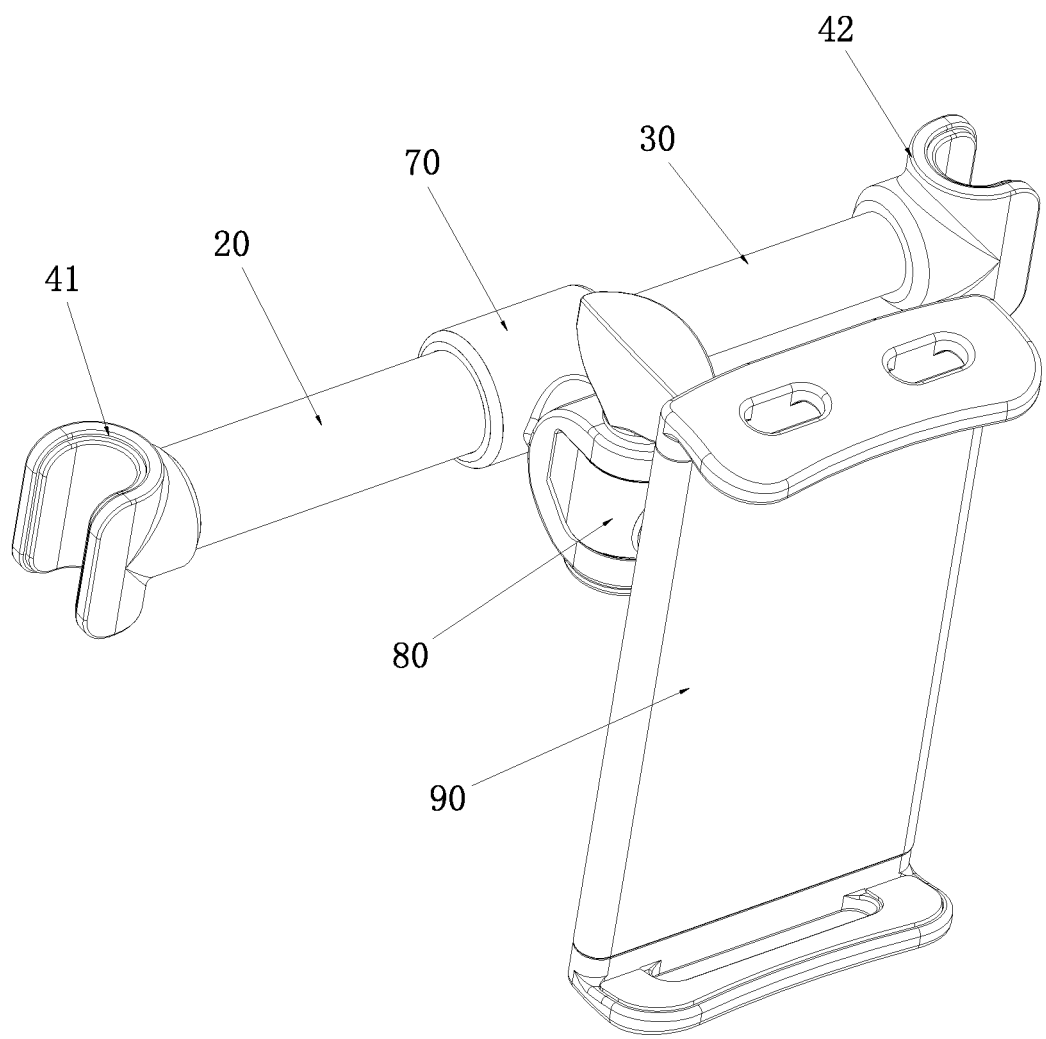
FIG. 1 is a perspective view according to an embodiment of the present invention.
Figure 2:
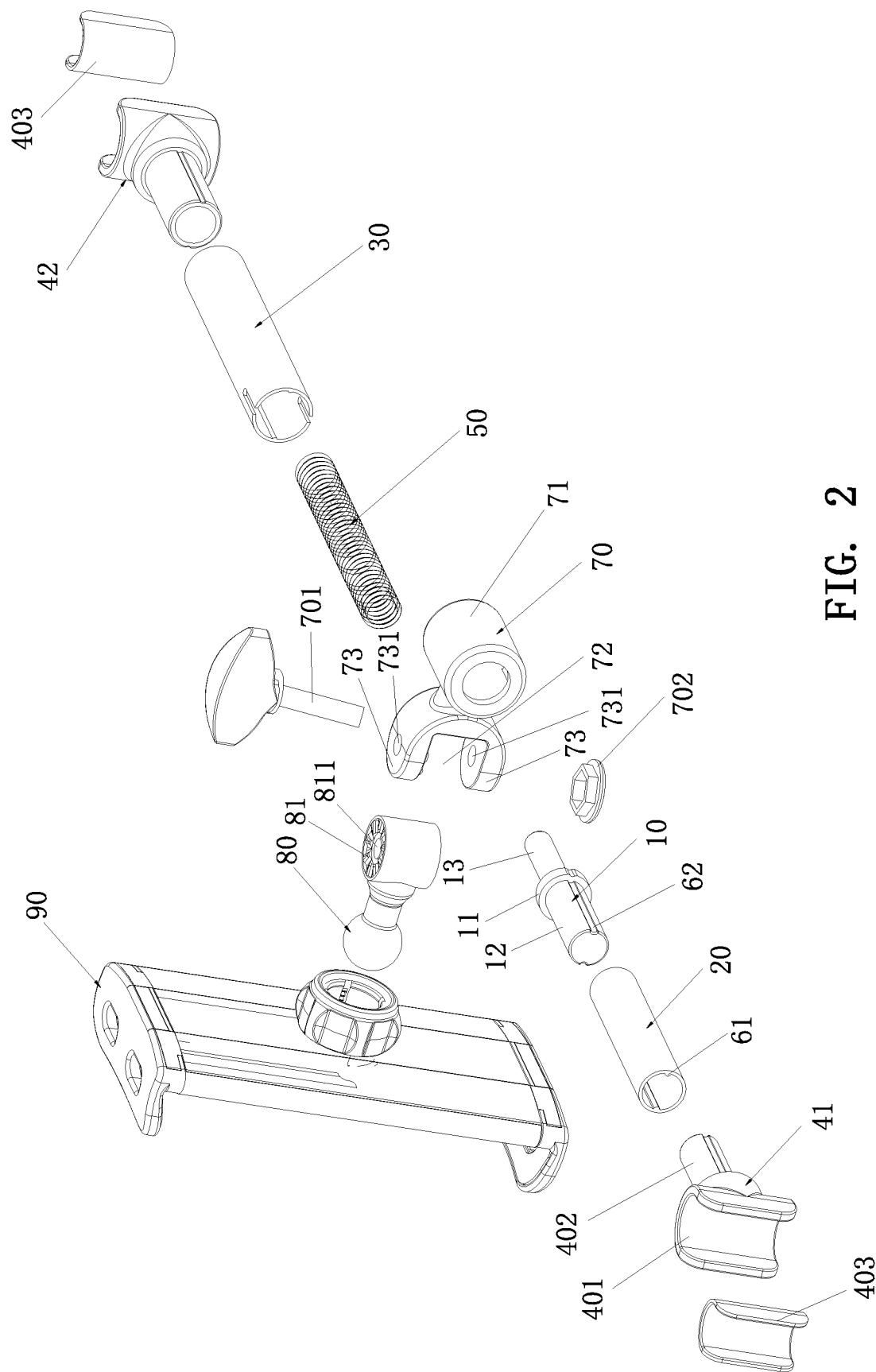
FIG. 2 is an exploded view according to an embodiment of the present invention.
Figure 3:
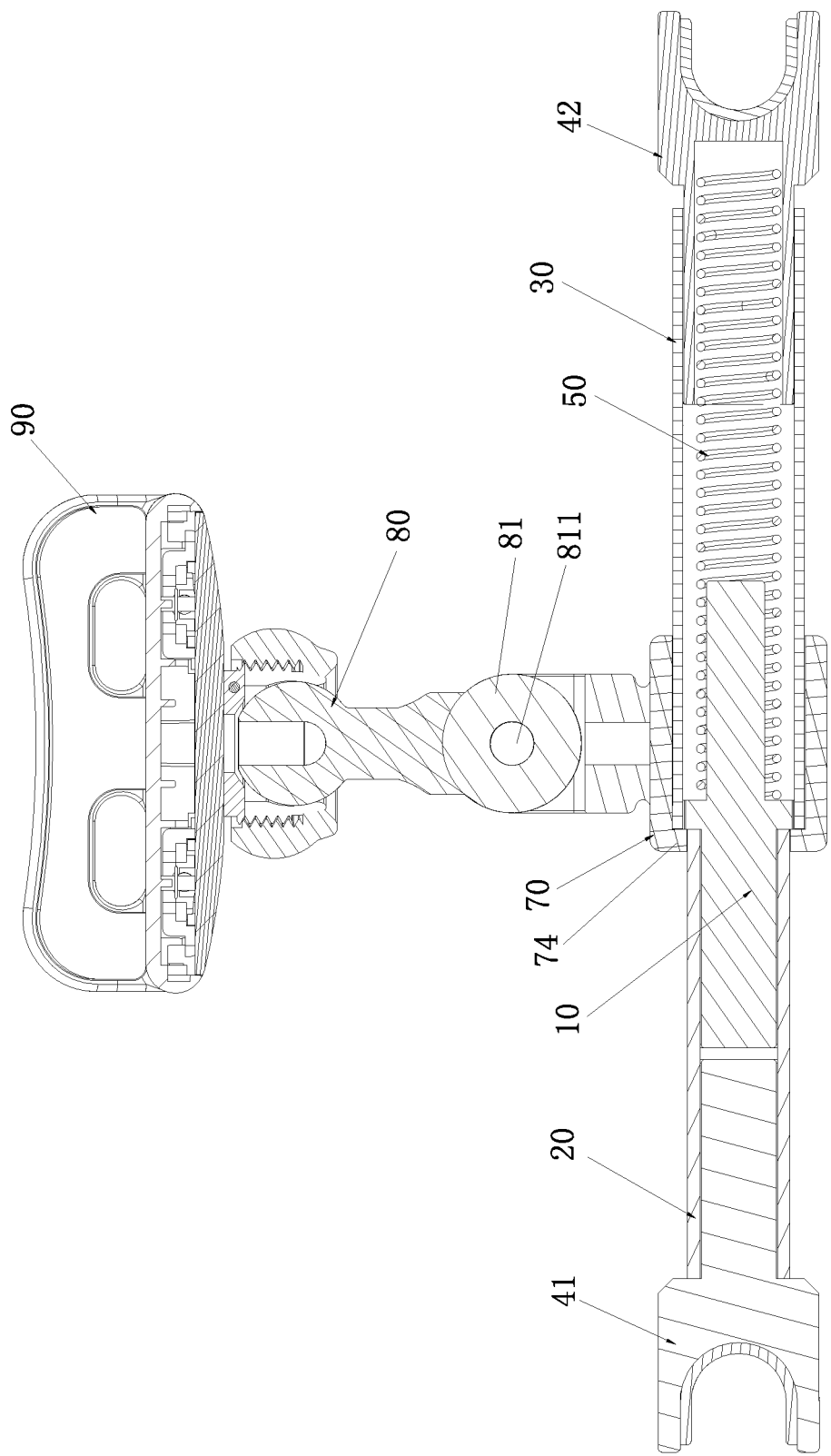
FIG. 3 is a cross-sectional view according to an embodiment of the present invention.
Figure 4:
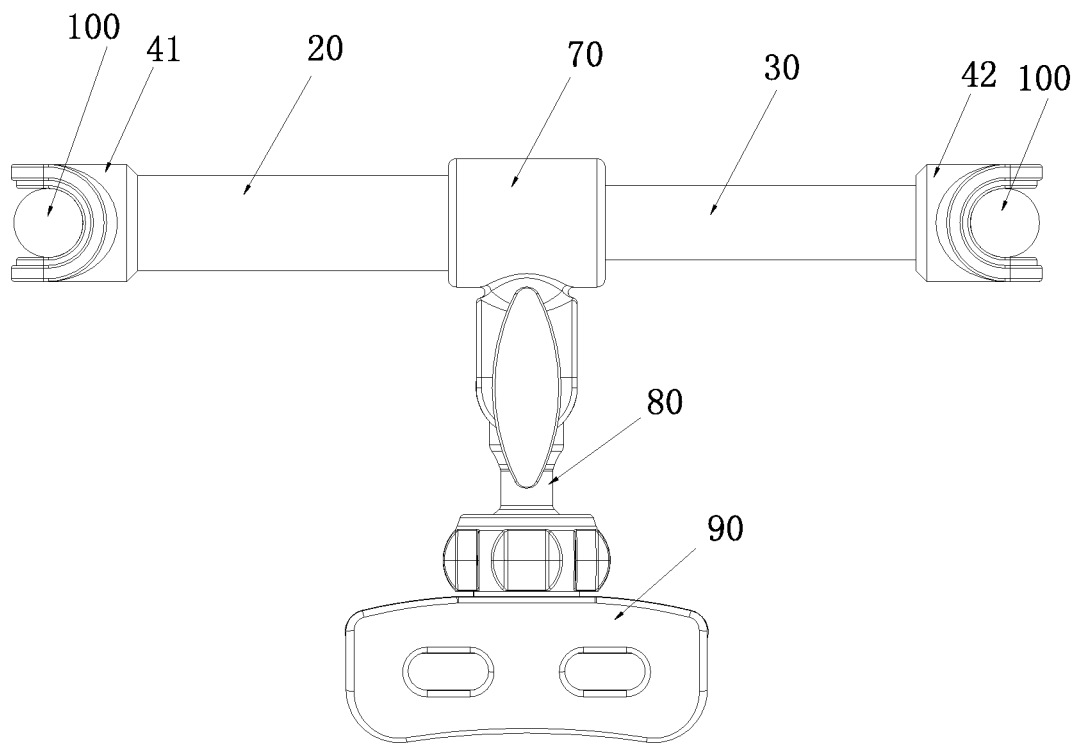
FIG. 4 is a schematic view according to an embodiment of the present invention when in use.

Please refer to FIG. 1 to FIG. 4, which shows a specific structure of an embodiment of the present invention. The extension tube-type vehicle-mounted back support comprises a mounting rod and a mounting part mounted on the mounting rod for retaining a mobile device.

The mounting rod includes a connector 10 and two connection tubes (20, 30 as shown in the drawings) respectively connected to the left and right ends of the connector 10. The outer ends of the two connection tubes are connected with clamping parts (41, 42 as shown in drawings), respectively. At least one of the connection tubes 30 is internally provided with a telescopic spring, and a corresponding one of the clamping parts 42 is biased by the telescopic spring to move left and right relative to the corresponding connection tube 30. In this embodiment, the telescopic spring is an extension spring 50, and the clamping part 42 has a U-shaped clamp 401 with an opening facing outward, and a U-shaped rubber buckle 403 is attached to the U-shaped clamp 401.

The inner sides of the clamping part 41 and the clamping part 42 are connected to insertion portions 402, respectively. The insertion portions 402 are inserted into the outer ends of the corresponding connection tubes. One of the outer surface of each insertion portion 402 and the inner surface of each connection tube is provided with a rib 61, and the other of the outer surface of each insertion portion 402 and the inner surface of each connection tube is provided with a groove 62. The rib 61 is fitted into the groove 62. Both the rib 61 and the groove 62 extend in the same axial direction as the connection tubes.

The mounting part includes a rotating rod 70 mounted on the mounting rod, a ball joint assembly 80 mounted on the rotating rod 70, and a brace 90 mounted on the ball joint assembly 80. The rotating rod 70 has a hollow rod body 71 and a pivot interface 72 connected to one side of the hollow rod body 71. The hollow rod body 71 is fitted on the mounting rod. The upper and lower sides of the pivot interface 72 are provided with locking walls 73 each having a first connecting hole 731. The ball joint assembly 80 has a pivot seat 81. The pivot seat 81 has a second connecting hole 811. The pivot seat 81 is inserted into the pivot interface 72. A screw 701 is inserted through the first connecting hole 731 of the upper locking wall 73, the second connecting hole 811, and the first connecting hole 731 of the lower locking wall 73 in sequence, and the lower end of the screw 701 is fitted with an adjusting nut 702. The screw 701 is provided with an adjusting handle to facilitate manual adjustment.

The connector 10 has a middle limiting portion 11 and two connecting shaft portions extending outward from two sides of the middle limiting portion 11 (the connecting shaft portion 12 and the connecting shaft portion 13 as shown in the drawings). The connection tube 20 is fitted on the outer periphery of the connecting shaft portion 12, and the connection tube 30 is fitted on the outer periphery of the middle limiting portion 11. One end of the telescopic spring (the extension spring 50 as shown in the drawings) is fitted on the outer periphery of the connecting shaft portion 13, and another end of the telescopic spring is connected to the corresponding clamping part 42. One end of the hollow rod body 71 extends radially inwardly to form an annular stop portion 74. The hollow rod body 71 is fitted on the outer periphery of the connection tube 30. The annular stop portion 74 is configured to limit the inner end of the connection tube 30.

The telescopic spring may be designed as a tension spring, and the corresponding clamping part is designed to have a hook portion with an opening facing inward. In use, one or two of the clamping parts are pulled outward, so that the two clamping parts are hooked on the outer sides of two metal rods, respectively. The mounting rod is positioned on the metal rods of the seat headrest by the spring tension. Compared with the design of the aforementioned U-shaped clamp, the overall size of the mounting rod is slightly larger for the design of the hook portion. Therefore, in the actual design application, the implementation as shown in FIG. 1 to FIG. 4 is optimized according to actual needs.

In summary, the design of the present invention is mainly focused on the fact that the mounting rod is designed as an elastically telescopic structure, and the installation application thereof is very simple. The mounting rod is directly mounted to the metal rods 100 of the seat headrest. When disassembled, the clamping part 42 is moved inwardly (or both the clamping part 41 and the clamping part 42 are moved inwardly), and the entire mounting rod can be taken out. Besides, the overall structure of the mounting rod is simple, compact, and excellent in stability.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An extension tube-type vehicle-mounted back support, comprising a mounting rod and a mounting part mounted on the mounting rod for retaining a mobile device; the mounting rod including a connector and two connection tubes respectively connected to left and right ends of the connector, outer ends of the two connection tubes being connected with clamping parts respectively, at least one of the connection tubes being internally provided with a telescopic spring, a corresponding one of the clamping parts being biased by the telescopic spring to move left and right relative to the connection tube having the telescopic spring;

wherein the mounting part includes a rotating rod mounted on the mounting rod, a ball joint assembly mounted on the rotating rod, and a brace mounted on the ball joint assembly; the rotating rod has a hollow rod body and a pivot interface connected to one side of the hollow rod body, the hollow rod body is fitted on the mounting rod, upper and lower sides of the pivot interface are provided with locking walls each having a first connecting hole; the ball joint assembly has a pivot seat, the pivot seat has a second connecting hole, the pivot seat is inserted into the pivot interface, a screw is inserted through the first connecting hole of the upper locking wall, the second connecting hole and the first connecting hole of the lower locking wall in sequence, and a lower end of the screw is fitted with an adjusting nut;

wherein the connector has a middle limiting portion and two connecting shaft portions extending outward from two sides of the middle limiting portion; one of the connection tubes is fitted on an outer periphery of one of the connecting shaft portions, and the other connection tube is fitted on an outer periphery of the middle limiting portion, one end of the telescopic spring is fitted on an outer periphery of the other connecting shaft portion, another end of the telescopic spring is connected to the corresponding clamping part; one end of the hollow rod body extends radially inwardly to form an annular stop portion, the hollow rod body is fitted on an outer periphery of the other connection tube, and the annular stop portion is configured to limit an inner end of the other connection tube.

2. The extension tube-type vehicle-mounted back support as claimed in claim 1, wherein the telescopic spring is an extension spring, and the clamping parts each have a U-shaped clamp with an opening facing outward.

3. The extension tube-type vehicle-mounted back support as claimed in claim 2, wherein a U-shaped rubber buckle is attached to the U-shaped clamp.

4. The extension tube-type vehicle-mounted back support as claimed in claim 1, wherein inner sides of the clamping parts are connected with insertion portions, and the insertion portions are inserted into the outer ends of the corresponding connection tubes.

5. The extension tube-type vehicle-mounted back support as claimed in claim 4, wherein one of an outer surface of each insertion portion and an inner surface of each connection tube is provided with a rib, the other of the outer surface of each insertion portion and the inner surface of each connection tube is provided with a groove, the rib is fitted into the groove, the rib and the groove extend in a same axial direction as the connection tubes.

* * * * *